April 8, 1952 E. W. ADAMS, JR 2,592,228

DECORDER FOR PULSE CODE MODULATION RECEIVERS

Filed July 7, 1947 2 SHEETS—SHEET 1

INVENTOR
E. W. ADAMS, JR.
BY George C. Ford
ATTORNEY

April 8, 1952 E. W. ADAMS, JR 2,592,228

DECORDER FOR PULSE CODE MODULATION RECEIVERS

Filed July 7, 1947 2 SHEETS—SHEET 2

INVENTOR
E. W. ADAMS, JR.
BY George C. Ford
ATTORNEY

Patented Apr. 8, 1952 2,592,228

UNITED STATES PATENT OFFICE 2,592,228

DECODER FOR PULSE CODE MODULATION RECEIVERS

Edgar W. Adams, Jr., Fair Lawn, N. J., assignor to Bell Telephone Laboratories, Incorporated, New York, N. Y., a corporation of New York Application July 7, 1947, Serial No. 759,418

11 Claims. (Cl. 179—15.6)

Figure 1:
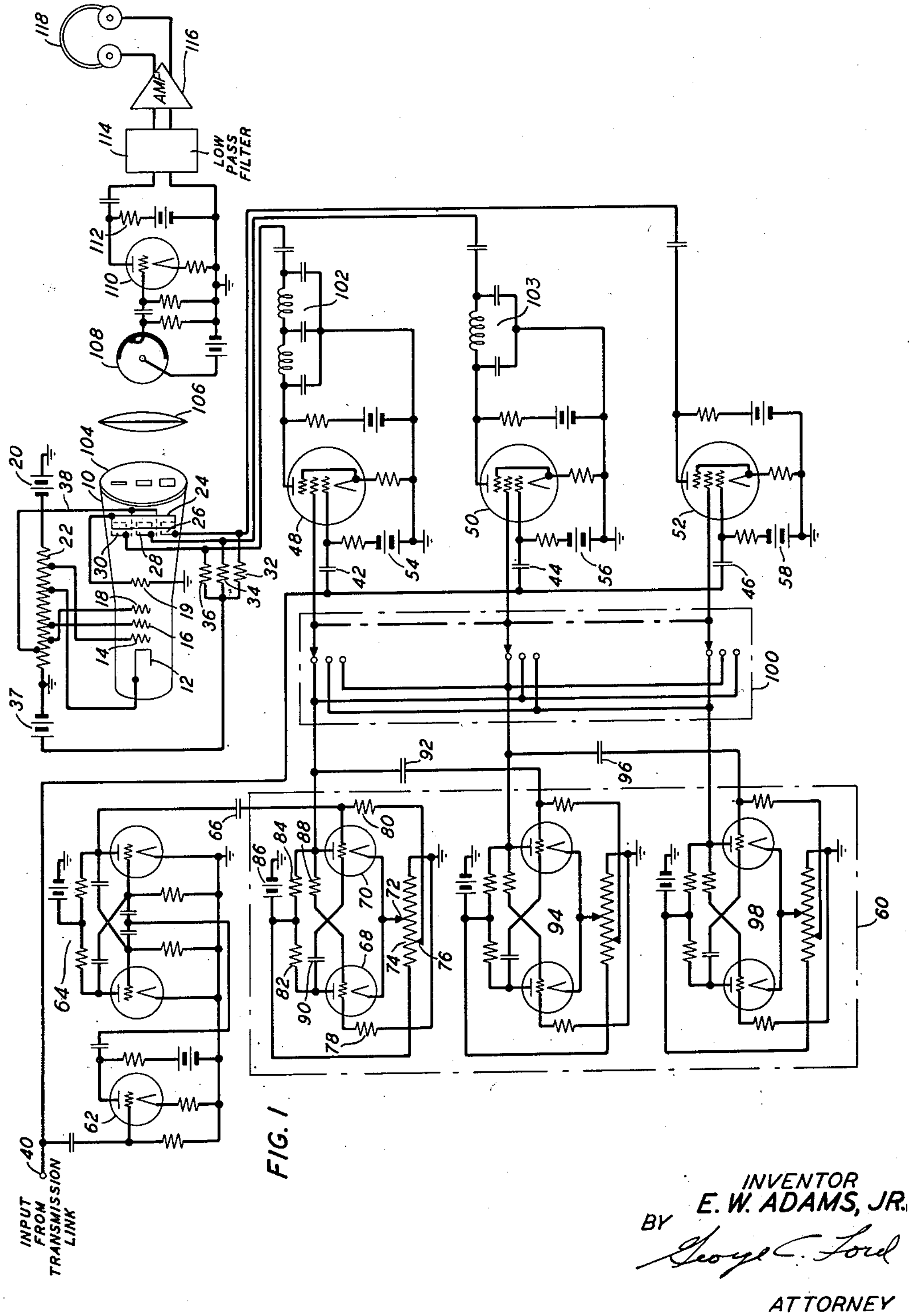

This invention relates to receivers for communication systems and more particularly to decoders for use in the receiving equipment of communication systems employing pulse code transmission.

In communication systems utilizing what is known as pulse code transmission, a speech wave or other signal to be transmitted is sampled periodically to ascertain its instantaneous amplitude. The measured instantaneous amplitude is expressed by pulse codes analogous to telegraph codes.

One code which conveniently may be employed in pulse code transmission involves permutations of a fixed number of code elements each of which may have any one of several conditions or values. An advantageous code of this type is the so-called binary code in which each of the fixed number of code elements may have either of the two values. One advantageous way of representing these values is to represent one by a pulse sometimes referred to as an "on pulse" and the other by the absence of a pulse sometimes referred to as an "off pulse." Alternatively, one value may be represented by a positive pulse and the other by a negative pulse. The total number of permutations obtainable with the binary code is proportional to $2_n$ where $n$ is the number of code elements employed.

Because the total number of different amplitudes which may be represented by such a code of a fixed number of elements is limited, it is found desirable to divide the continuous range of amplitude values of which the transmitted signal is capable into a fixed number of constituent ranges which together encompass the total range. Each of these smaller or constituent amplitude ranges may then be treated as if it were a single amplitude instead of a range and is represented by an individual one of the permutations of the code. In the use of this method of code transmission the instantaneous amplitude ascertained by a sampling operation is represented by the respective permutation indicative of the amplitude range, or step, which most nearly approximates the amplitude of the measured sample. If, for example, the sample amplitude is nearest to that amplitude represented by the ninth step of the signal amplitude range the permutation code corresponding to range 9 is transmitted.

It will be observed that each code element in one of its values represents the presence in the sampled amplitude of a particular fixed portion of the total amplitude range, while in the other value it represents the absence of that same portion.

The code element signals or pulses of course require different channels for their transmission. These in general have been obtained by either frequency or time division multiplex; that is, the $n$ elements of a code group may be transmitted consecutively over a single line or frequency channel or they may be transmitted simultaneously on different frequency channels.

In either event, the received code groups of pulses are employed at the other station to control the generation of pulses proportional to the sample amplitudes. For this purpose, it is necessary to weight or evaluate each of the code element signals to determine the portion of the total amplitude represented thereby, and to generate an electrical quantity, the amplitude of which is proportional, in each case, to the amplitude represented by the code element signal evaluated in the first step, and finally, the quantities so generated must be added together. In systems employing serially transmitted code element pulses, the weighting or evaluating circuits must operate at the code element rate and, since the summation process occurs only at the code group rate, the evaluation and adding must necessarily be accomplished in separate circuits. When the code elements are transmitted simultaneously over separate channels, the operating speed of the evaluating equipments may be reduced since all operations are performed at the code group rate. On the other hand, a separate circuit is required for each code element.

It is an object of the present invention to provide simple high speed decoders for pulse code modulation receivers.

It is a further object of the invention to provide decoders in which the code element pulses of a code group are simultaneously weighted and combined.

In accordance with the invention, a cathode ray tube having means for producing a planar sheet of electrons therein is employed to weight and add the code element signals of received code groups. In this cathode ray tube a deflection system controls the deflections normal to the electron sheet of individual portions thereof, a separate portion being controlled by each of the code element signals. All of the code element signals of a code group are applied simultaneously to the deflection system and means responsive to the deflected portions of the electron sheet are arranged to produce currents proportional respectively to the amplitude increments represented by the code elements signals producing the deflections.

In the equipment for decoding serially transmitted code groups in accordance with the invention, the individual code element pulses of a group are subjected to suitable delays so that they are available simultaneously in separate circuits for simultaneous application to the deflection system of the decoder tube. In systems employing simultaneously transmitted code element signals in separate circuits, the signals are also applied simultaneously to the deflection system.

From the above it will be recognized that the number of elements in the deflection system of the decoder tube, and of certain associated circuits, depends upon the number of code elements employed in the code groups to be received. In the following, and for purposes of illustration, it is assumed that the transmitted code groups comprise three code element signals.

Figure 2:
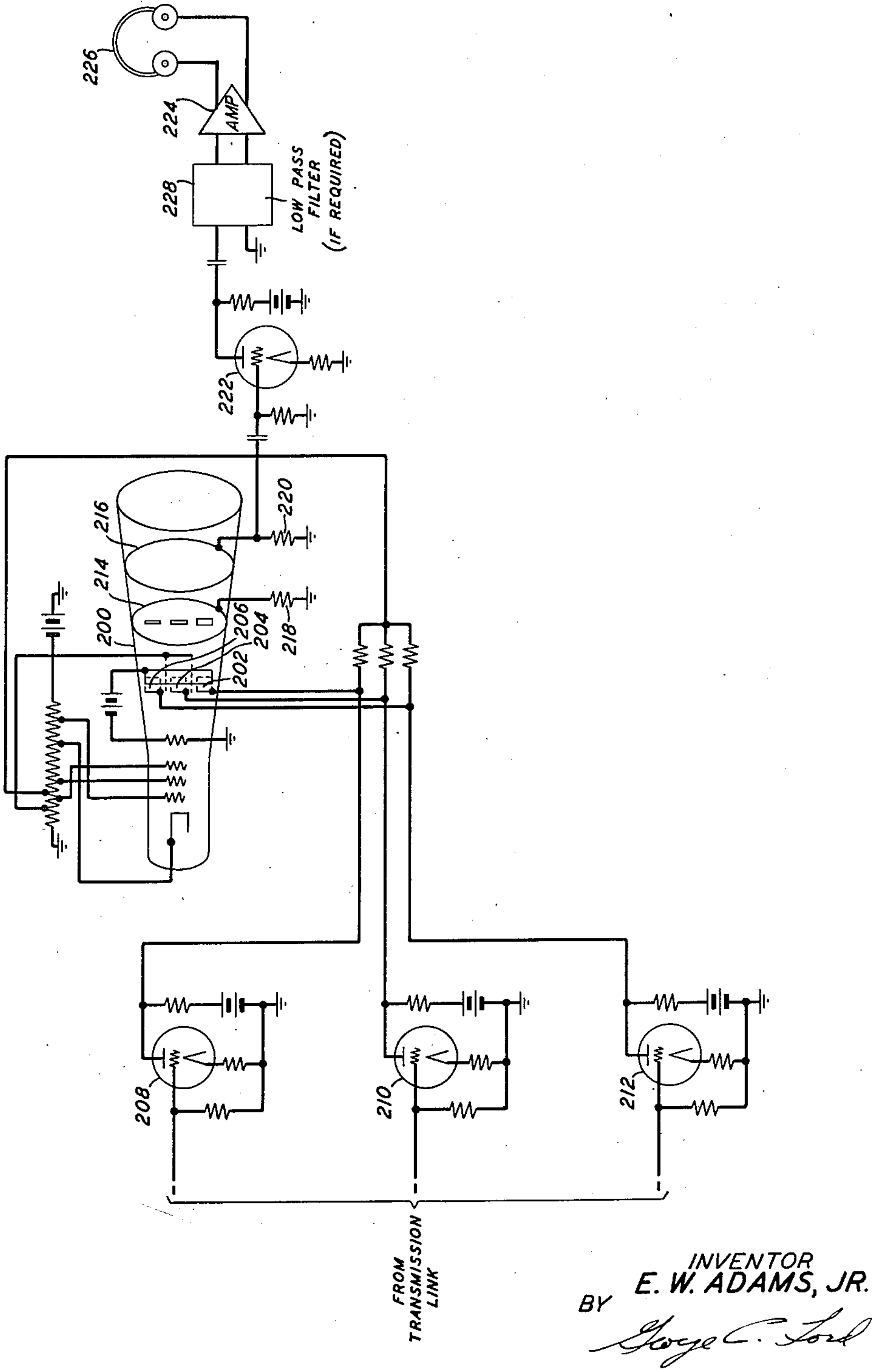

In the drawings:

Fig. 1 is a schematic circuit diagram of a decoder for use in pulse code modulation systems employing serial transmission of the code elements; and Fig. 2 is a schematic circuit diagram of a decoder for use in pulse code modulation systems employing simultaneous transmission of the code elements.

In the circuit of Fig. 1, the pulse output of a transmission line system or the demodulated output signal from the receiver of a radio link carrying pulse code modulation signals is applied in parallel to a plurality of gated amplifiers, corresponding in number to the number of code elements per code group. These gated amplifiers are gated on in turn for periods equal to the time interval allotted to a single code element. The output pulses from the gated amplifiers are subjected to delays to bring them into time coincidence and are applied to the deflection system of the decoder tube in which they are weighted and combined to reconstruct the signal.

Referring now to Fig. 1, the decoder tube 10 is a special cathode ray tube. The electron gun system of this tube comprising cathode 12, control grid 14 and first and second anodes 16 and 18, respectively, is arranged to produced a planar sheet of electrons oriented (in the drawing) in the vertical plane. Since this type of electron beam intercepts the screen of the tube as a line rather than as a point, it may be referred to as a line beam. For reasons which will appear below, the electrode system is so arranged that the electron sheet will intercept the screen in a relatively broad line. Suitable operating potentials for the various elements of the decoder tube are obtained from a power supply comprising battery 20 and potentiometer 22 connected in a series circuit with the positive terminal of the battery grounded. In this arrangement, which is of conventional type, the third anode 19 is operated at ground potential while cathode 12 is operated at a high negative potential. The lead from control grid 14 is returned to a point on potentiometer 22 which is somewhat more negative than the potential applied to the cathode, while the first and second anodes 16 and 18 are operated at potentials which are less negative than the cathode.

The deflection system of the decoder tube comprises a single deflecting plate 24 extending vertically across substantially the entire diameter of the tube and a set of individual deflecting plates disposed in a vertical plane parallel to and spaced from the plane of the single deflecting plate 24. The number of such individual deflecting plates depends upon the number of code elements employed in the code groups to be received. As shown the tube is arranged to receive a 3-element code and is provided with individual deflectory plates 26, 28 and 30. Deflecting plate 24 is operated at ground potential while individual deflecting plates 26, 28 and 30 are connected through isolating resistors 32, 34 and 36, respectively, to the positive terminal of battery 37, the negative terminal of which is connected to ground. Thus the electron beam or sheet is normally deflected to the right-hand side of the screen of decoder tube 10. The Faraday shield 38 has sections extending between the adjacent deflecting plates 26, 28 and 30 and is operated at a negative potential. This shield tends to split up the electron sheet and assists the deflecting electrodes 26, 28 and 30 in controlling separate portions thereof without interaction. Thus if a negative potential is applied to any one of the deflecting electrodes 26, 28 and 30, the portion of the electron sheet controlled thereby is deflected to the left and a segment of the line intercept of the beam on the screen is accordingly deflected toward the left-hand side of the screen. The three code element signals, which comprise the code groups assumed herein for purposes of illustration, are applied simultaneously to the deflecting system, one code element signal being applied to each of the deflecting plates 26, 28 and 30.

The circuits for obtaining the three code element signals simultaneously and in separate circuits from the single input circuit in which they occur in succession will now be described. It will be recalled that the code groups appearing at terminal 40 each comprise three pulses which, depending upon the amplitude of the signal represented by the code group may be either "on" or current pulses or "off" or no-current pulses. Thus there may be three successive "on" or three successive "off" pulses or any combination thereof in each code group. These code element pulses are applied in parallel through capacitors 42, 44 and 46, to the amplifier tubes 48, 50 and 52, respectively, which may conveniently be pentode type tubes. As shown in Fig. 1, the code element signals are applied to the control grids of the amplifier tubes. Normally the potentials applied to the screen grids of these tubes are sufficiently low to prevent the passage of current through the amplifier tubes in response to code element pulses alone. If a positive gate pulse of sufficient amplitude is applied to the screen grid of any of these amplifiers, however, a code pulse simultaneously applied to the control grid will be gated through the tube and will appear at the output thereof. Bias batteries 54, 56, and 58 in the control grid circuits prevent the flow of current through tubes 48, 50, and 52, respectively, in response to gate pulses alone.

Amplifier tubes 48, 50 and 52 are gated on in succession and each is allowed to pass current for one-third of the code group period by gate voltages derived from gate generator unit 60. The gate generator unit, which comprises a series of single trip multivibrators is actuated by negative pulses derived from the received code pulses. For this purpose, a portion of the demodulated output from the radio receiver is applied to a phase inverting amplifier stage comprising triode 62. The positive code element pulses from the transmitter are thus inverted and the resulting negative pulses are applied to a multivibrator 64, the circuit arrangement of which is conventional in all details. This multivibrator is tuned to operate at a frequency very near the code group repetition frequency. Although in general not all of the code pulses in any code group will be "on" pulses and there may be several successive code groups in which all of the code pulses are "off" pulses, a sufficient number of code pulses will be received to cause the multivibrator 64 to lock in at the code group frequency, that is, at one-third of the code element frequency. The output of multivibrator 64 comprising negative pulses occurring at the code group frequency is applied through capacitor 66 to the first of the three single-trip multivibrators comprising the gate generator circuit. These three single-trip multivibrators or single square wave generators are identical and only the first will be described in detail.

The first single-trip multivibrator which is similar to that shown and described at page 360 of "Theory and Applications of Electron Tubes, 2d edition, by H. J. Reich, McGraw-Hill 1944," comprises two tubes, 68 and 70, which may conveniently be triodes. The cathodes of the two tubes are connected together and to contact 72 of divider resistor 74 connected between battery 86 and ground. The grid of tube 68 is connected to ground while that of tube 70 is connected through resistor 80 to contact 76 of divider 74. The anodes of the two tubes are connected through the respective resistors 82 and 84 to the positive terminal of battery 86, the negative terminal of which is connected to ground. The plate of tube 70 is connected through resistor 88 to the grid of tube 68 while the plate of tube 68 is connected through capacitor 90 to the grid of tube 70. In the operation of this circuit the bias voltage supplied tube 70 by divider 74 is so adjusted that in the absence of externally applied voltages, current flows through tube 70. The resultant voltage drop across resistor 84, applied through resistor 88 to the grid of tube 68 effectively prevents the flow of current therethrough. Upon receipt of a negative pulse from multivibrator 64, the current flow through tube 70 is suddenly interrupted. The plate voltage thereof rises and because of the cross connection to the grid of tube 68, causes that tube to begin conducting. When this occurs, capacitor 90 discharges through resistor 80, the current being in such direction as to maintain the grid of tube 70 at a negative potential even after the negative pulse which initiated the switching operation has ceased. After a time determined by the values of capacitor 90 and resistor 80, the potential at the grid of tube 70 rises sufficiently to permit the reestablishment of current flow through that tube. When this occurs, the voltage of the plate of tube 70 and consequently of the grid of tube 68 drops, tube 68 is cut off and the circuit returns to its initial condition. Thus it will be understood that a single positive square pulse appears across anode resistor 84 in response to each negative pulse from multivibrator 64.

This square pulse is applied through coupling capacitor 92 to the grid of the normally conducting right-hand tube of the second single trip multivibrator generator 94 in the chain and the square pulses generated across the load resistor of this tube are applied through coupling capacitor 96 to the grid of the normally conducting right-hand tube of a third single trip multivibrator 98. The single positive pulse from the first single trip multivibrator is differentiated in the circuit comprising capacitor 92 and the grid resistor of the right-hand tube of single trip multivibrator 94. It will be recognized that as the plate of tube 70 becomes more positive upon receipt by the first single-trip multivibrator of a negative pulse from multivibrator 64, the grid of the right-hand tube of the single-trip multivibrator 94 is driven positive by the differentiated leading edge of the square pulse. Since this tube is already conducting, no change is produced at this time. However, at the conclusion of the single square pulse from the plate of tube 70 of the first single-trip multivibrator, the differentiated trailing edge of the pulse applied to the grid of the right-hand tube of the second trip multivibrator 94 drives the grid negative to initiate the generation of a single square pulse in that circuit. Since the generation of a single square pulse in single-trip multivibrator 94 is initiated upon the completion of a single square pulse in the first single-trip multivibrator, it will be seen that the two square pulses follow in immediate succession. In a similar fashion, a third single square pulse following immediately after the output pulse from single-trip multivibrator 94 is produced in the output of single-trip multivibrator 98.

Thus three successive single square pulses are produced in separate circuits and each square pulse is made equal in duration to a single code element interval by adjusting the time constants of the single trip multivibrator circuits. Because these pulses are produced under the control of the received code element signals they occur in synchronism with those signals. Since, however, multivibrator 64 may lock into synchronism with any one of the three code elements of a code group, it is possible that the single square pulse from the first generator will not occur during the first third of the code group. Accordingly, there is provided a phasing circuit 100, shown here as comprising a simple three-gang selector switch. This switch is shown in Fig. 1 in the position which it would occupy if the output pulse from the first single trip multivibrator were to occur during the first third of the code group period. It will be recognized that the interconnections shown in Fig. 1 permit the application of the single square pulses from each of the single-trip multivibrators to any one of amplifier tubes 48, 50 and 52. This type of phasing circuit may be employed where there is a greater number of code elements per code group, although for systems employing a large number of code elements it may be desirable to utilize more refined synchronizing circuits in which provision is made for eliminating phase ambiguity. When initiating the operation of the illustrative system described herein, the selector switch is turned from position to position until an intelligible output signal is obtained from the system.

From the above it will be seen that when proper phasing is obtained, amplifiers 48, 50 and 52 are gated on during the first, second and final thirds of the code group. If a code element pulse occurs in the first third of the code group it will be transmitted through amplifier 48. If one occurs in the second third, it will be transmitted through amplifier 50, etc. Thus the pulses of the received code groups are made available in separate physical circuits and occur in the order transmitted. In order to obtain the code element signals simultaneously, the output circuit of amplifier 48 includes a delay circuit 102 arranged to introduce a delay equal to two-thirds of the code group period while the output circuit of amplifier 50 includes a delay circuit 103 arranged to introduce a delay equal to one-third of the code group period. These delay circuits are shown in Fig. 1 as comprising networks of series inductors and shunt capacitors although other delay circuits as, for example, lengths of transmission line, may be used. Assuming, for purposes of discussion, that the received code group includes three "on" pulses, the first pulse will be transmitted through amplifier 48, delayed by an interval equal to two-thirds of the code group period and applied to deflecting plate 30 of decoder tube 10. Similarly, the second pulse will be transmitted through amplifier 50, delayed by an interval equal to one-third of the code group and applied to deflecting plate 28 of decoder tube 10. Since the second code pulse occurred in the center third of the code group period and was delayed by one-third of the code group interval, it and the pulse from amplifier 48 are applied simultaneously to the deflecting plates 28 and 30 of the decoder tube during the final third of the code group period. At the same time the third code element pulse is transmitted through amplifier 52 and applied without delay to the deflecting plate 26. These pulses are of negative polarity and overcome the bias provided by battery 37. Accordingly, all three segments of the electron beam of the decoder tube are deflected toward the center of the screen thereof. If, on the other hand, the received code group includes one or more "off" or no-current pulses, as for example a group comprising "off," "on," "off" pulses, the single "on" pulse, occurring in the second third of the code group period, will be transmitted through amplifier 50 and applied after appropriate delay to deflecting plate 28. Consequently only the central segment of the electron sheet will be deflected to the center of the screen.

The code element signals are evaluated or weighted by an opaque mask 104 positioned over the screen of decoder tube 10 and having therein a series of openings equal in number to the number of code elements employed in the code groups. These openings which are disposed in a row parallel to the deflecting plate system of the decoder tube are of areas respectively proportional to 1, 2 and 4 units of amplitude thus corresponding to the portions of amplitude represented by the three code element signals of the code group. Conveniently the mask openings may all be of equal heights and of widths proportional to the amplitude portions. In any event the widest opening must be narrower than the intercept of the electron sheet on the screen of the tube. Thus if the first code element signal represents the smallest portion of the total amplitude, the upper opening in the mask is made one unit wide, the central opening two units wide and the lower opening four units wide. Assuming that a particular received code group contains only one "on" pulse occurring in the second third of the group and two "off" pulses, a deflecting voltage will be applied only to deflecting plate 28. Accordingly, only the portion of the screen behind the central opening of mask 104 will be illuminated by the electron sheet and the total amount of light passing through the mask will be proportional to two units of amplitude.

The light passing through mask 104 is focused by a lens system indicated schematically at 106, upon the cathode of a phototube 108 which is connected in a conventional circuit with an amplifier 110. The output of amplifier 110 is proportional in amplitude to the total amount of light transmitted through mask 104. Accordingly, for each code group, an output voltage proportional to the amplitude represented by the code group appears across resistor 112, the code element signals having been weighted and added by decoder tube 10 and converted into a light pulse of total energy equal in amplitude to the amplitude represented by the particular code group received. The successive output voltages appearing across resistor 112 correspond therefore to the amplitude samples taken at the transmitter and these are applied through a low pass filter 114 which may comprise a combination of suitably proportioned series inductors and shunt capacitors as shown, for example, in Table 2, page 228 of "Radio Engineers Handbook" by F. E. Terman and is arranged to eliminate the code group frequency component and any higher frequencies from the output signal, to an amplifier 116 which may comprise a conventional audio frequency amplifier as described in "Radio Engineers Handbook" by F. E. Terman, beginning at page 354. The output of the amplifier may be applied to head phones 118 or any other suitable transducer.

The decoding system of Fig. 2 is arranged for use with pulse code modulation systems in which the several code element signals of a code group are transmitted simultaneously. As in the apparatus of Fig. 1, a decoder tube 200 is employed. The electron gun and deflecting electrode system of this decoder tube as well as the arrangements for applying operating potentials with the exception of bias voltage for the deflecting plates are identical to those of decoder 10 and will not be described again in detail.

Assuming a code group of three code elements, the deflecting system is shown as having three separate deflecting plates 202, 204 and 206. Deflecting plates 202, 204 and 206 are connected through isolating resistors to a source of negative potential, as for example, the power supply voltage divider, the negative potential being of sufficient amplitude to balance out most of the positive potential applied to these deflecting plates from the anode batteries of direct coupled amplifiers 208, 210 and 212. The net positive potential applied to these deflection plates in the absence of signal voltages is sufficient to deflect the electron beam to the right-hand side of the tube. The positive code element signals, corresponding to "on" signals, from the three transmission channels are amplified and inverted in conventional direct-coupled amplifiers 208, 210 and 212 and are applied to deflecting plates 202, 204 and 206, respectively. These negative signals overcome the positive bias on the deflecting plates and allow the beam to move to the center of the tube. In the particular decoding tube shown in Fig. 2 the external mask 104 employed with decoder 10 is eliminated and is replaced by an internal conducting plate or mask 214 having the same configuration as the mask and disposed in the same relative orientation. A collector plate 216 is positioned beyond the masking plate 214 and these plates are connected respectively through resistors 218 and 220 to ground. The openings shown in mask 214 are arranged on the assumption that the code element signal representing the smallest portion of the total amplitude transmitted over the system, is transmitted over the channel connected to deflecting plate 206, the code element signal corresponding to the next largest portion of amplitude is transmitted over the channel connected to deflecting plate 204, etc. If a particular code element signal is present, the appropriate portion of the electron beam will be deflected to pass through the corresponding opening in mask 214 and will strike collector plate 216. Accordingly, the total current reaching collector plate 216 and flowing through resistor 220 is proportional to the amplitude represented by the code group being received, in the same way that the total amount of light passing through the mask of decoder tube 10 is proportional to the value represented by the code group producing that light. Accordingly, the voltage appearing across resistor 220 is applied through the conventional amplifier 222 to terminal equipment 224 and thence to an output transducer shown in Fig. 2 as a pair of head phones 226. The low pass filter 228 may be provided if the simultaneous transmission over the several individual channels is of intermittent nature. If the code element signals are continuously transmitted, this low pass filter will not be required.

It will be obvious that decoder tube 200 of Fig. 2 may be substituted for decoder tube 10, lens system 106 and photoelectric cell 108 of Fig. 1 and vice versa, the two types of decoder tube being completely interchangeable.

Each of the systems of Figs. 1 and 2 have been shown and described as arranged for use with three element code in which the signal representing the smallest amplitude element is transmitted first. It will be recognized that the code elements may be transmitted in reverse order and that the systems may be modified to operate with code groups of other than three code elements.

What is claimed is:

1. A decoder for communication systems wherein the instantaneous amplitude of a signal wave is represented by code groups of a fixed number of two-valued signals each denoting in one value the presence of a different portion of the total possible amplitude of the signal wave, said decoder comprising a cathode-ray tube, means for producing a sheet of electrons therein, a deflecting system arranged to control deflections of individual portions of the electron sheet, the number of said individually deflectable portions being equal to said fixed number of signals, means for applying the signals of a code group simultaneously to said deflection system each signal controlling the deflection of a different one of said portions, means responsive to deflections of said individual portions of the electron sheet produced by signals of said one value for generating currents respectively proportional to the amplitude portions represented by the signals causing such deflections and means for adding said currents.

2. A decoder for communication systems wherein the instantaneous amplitude of a signal wave is represented by code groups of two-valued signals each of which in one value represents a different portion of the total possible amplitude of the signal wave, said decoder comprising a cathode-ray tube, means for producing a sheet of electrons therein, a deflecting system arranged to control deflections of individual portions of the electron sheet, the number of said individually deflectable portions being equal to the number of signals in said code groups, means for simultaneously applying the signals of a code group to said deflection system each signal controlling the deflection of a different one of said portions and means responsive to deflections of said individual portions of the electron sheet produced by signals of said one value for generating a current proportional to the sum of the amplitude portions represented by the signals causing such deflections.

3. A decoder for communication systems wherein the instantaneous amplitude of a signal wave is represented by code groups of two-valued signals each of which in one value represents a different portion of the total possible amplitude of the signal wave, said decoder comprising a cathode-ray tube, means for producing a plurality of individually deflectable electron sheets therein, each of said sheets corresponding to one of the signals in said code groups, means for simultaneously applying the signals of a code group to cause deflection of said electron sheets to which they correspond, and means responsive to deflection of said electron sheets produced by signals of said one value for generating a current proportional to the sum of the amplitude portions represented by the signals causing such deflections.

4. In a decoder for communication systems wherein the instantaneous amplitude of a signal wave is represented by code groups of serially transmitted two-valued signals each denoting in one value the presence of a different portion of the total possible amplitude of the signal wave, a cathode-ray tube, means for producing a sheet of electrons therein, a deflecting system arranged to control deflections of individual portions of the electron sheet, the number of said individually deflectable portions being equal to the number of signals in said code groups, means for bringing the serially transmitted signals of a code group into time coincidence, means for applying the coincident signals from said last-mentioned means to said deflecting system each signal controlling the deflection of a different one of said portions, and means responsive to the deflections of said individual portions of the electron sheet produced by signals of said one value for generating currents respectively proportional to the amplitude portions represented by the signals causing such deflections.

5. In a decoder for communication systems wherein the instantaneous amplitude of a signal wave is represented by code groups of two-valued signals each denoting in one value the presence of a different portion of the total amplitude of the signal wave, a cathode-ray tube, means for producing a sheet of electrons therein, a deflecting system arranged to control deflections of individual portions of the electron sheet, the number of said individually deflectable portions being equal to the number of signals in said code groups, means for storing each pulse of a code group as received until the end of the code group, means operative after the completion of a code group for simultaneously applying the stored signals of that code group to said deflecting system each signal controlling the deflection of a different one of said portions, and means responsive to the deflections of said individual portions of the electron sheet produced by signals of said one value for generating currents respectively proportional to the amplitude portions represented by the signals causing such deflections.

6. A decoder for communication systems wherein the instantaneous amplitude of a wave to be transmitted is represented by code groups of successively transmitted pulses each of which may have either of two values and in one value denotes the presence of a different portion of the total possible amplitude of the complex wave, said decoder comprising a cathode-ray tube, means for producing a sheet of electrons therein, a deflecting system arranged to control deflections of individual portions of the electron sheet, the number of said individually deflectable portions being equal to the number of code pulses in the code groups, means for delaying each code pulse as received by an interval equal to the period between its time of occurrence and the end of the code group, means for applying the delayed pulses to said deflecting system each signal controlling the deflection of a different one of said portions and means responsive to deflections of said portions of the electron sheet produced by signals of said one value for generating a current proportional to the sum of the amplitude portions represented by the signals causing such deflections.

7. In a decoder for communication systems wherein the instantaneous amplitude of a signal wave is represented by code groups of serially transmitted bi-valued pulses each of which in one value represents a fixed portion of the total amplitude of said signal wave, a cathode-ray tube, means for producing a sheet of electrons therein, a deflecting system comprising an individual deflecting plate corresponding to each of the code pulses in said code groups and arranged to control deflections of individual portions of said electron sheet, individual input circuits for each of said deflecting plates, each of said input circuits including means for storing the pulses until the completion of said code group, means for applying the pulses of a code group as received to the input circuits for the deflecting plates to which said pulses correspond, and means responsive to the deflections of said individual portions of the electron sheet produced by the stored pulses of said one value for generating currents respectively proportional to the amplitude portions represented by said stored pulses.

8. A decoder for communication systems wherein the instantaneous amplitude of a signal wave is represented by code groups of serially transmitted two-valued pulses each of which in one value denotes a different fixed portion of the total possible amplitude, said decoder comprising a cathode-ray tube, means for producing a sheet of electrons therein, a deflecting system comprising an individual deflecting plate for each pulse of said code groups arranged to control deflections of individual portions of said sheet of electrons, means responsive to deflections of said electron beam portions for producing currents respectively proportional to said different portions of amplitude, and means for applying simultaneously each of said deflecting plates the code pulse corresponding thereto.

9. A decoder for communication systems wherein the instantaneous amplitude of a wave to be transmitted is represented by code groups of two-valued signals each denoting in one value the presence of a different portion of the total possible amplitude, said decoder comprising a cathode-ray tube, means for producing a sheet of electrons therein, a deflecting system arranged to control deflections of individual portions of the electron sheet normal to the plane thereof, one of said individually deflectable portions corresponding to each of the signals in said code groups, means for simultaneously applying the signals of a code group to said deflecting system to control deflections of the portions of the sheet to which they correspond, a mask positioned over the screen of said tube and having openings therein equal in number to said individually deflectable portions of the electron sheet arranged in line parallel to the plane of said sheet, one of said openings being traversed by light from said screen upon deflection from each of said sheet portions and the area of each opening being proportional to the amplitude portion represented by the signal causing said deflection, and means for producing a current proportional to the total amount of light passing through said mask.

10. A decoder for communication systems wherein the instantaneous amplitude of a wave to be transmitted is represented by code groups of two-valued signals each denoting in one value the presence of a different portion of the total possible amplitude, said decoder comprising a cathode-ray tube, means for producing a sheet of electrons therein, a deflecting system arranged to control deflections of individual portions of the electron sheet normal to the plane thereof, the number of said individually deflectable portions being equal to the number of signals in said code groups, means for simultaneously applying the signals of a code group to said deflecting system each signal controlling the deflection of a different one of said portions, a mask over the screen of said tube having openings therein respectively proportional in area to the amplitudes represented by the code group signals and arranged to control the amount of light emanated in response to deflections of the electron sheet portions produced by said signals, and means for producing a current proportional to the total amount of light passing through said mask.

11. A decoder for communication systems wherein the instantaneous amplitude of a signal wave is represented by code groups of pulses each denoting a different portion of the total amplitude of the signal wave, said decoder comprising a cathode-ray tube, an electron gun arranged to produce an electron sheet therein, a deflecting system arranged to control individual deflections of separate portions of said electron sheet one corresponding to each of the individual pulses in said code group, means for simultaneously applying the pulses of a code group to said deflecting system to control deflections of the portions of sheet to which they correspond, a masking plate intercepting said sheet and provided with an opening for each of said separately deflecting portions to control the flow of electrons through said mask upon deflection of said separate portions in response to the applied pulses, and a collector plate for electrons traversing said mask.

EDGAR W. ADAMS, Jr.

REFERENCES CITED

The following references are of record in the file of this patent:

UNITED STATES PATENTS

| Number | Name | Date |
|---|---|---|
| 1,757,345 | Strobel | May 6, 1930 |
| 2,144,337 | Koch | Jan. 17, 1939 |
| 2,189,898 | Hartley | Feb. 13, 1940 |
| 2,262,838 | Deloraine | Nov. 18, 1941 |
| 2,272,070 | Reeves | Feb. 3, 1942 |
| 2,313,209 | Valensi | Mar. 9, 1943 |
| 2,412,350 | Morgan | Dec. 10, 1946 |
| 2,443,198 | Sallach | June 15, 1948 |
| 2,489,883 | Hecht | Nov. 29, 1949 |

FOREIGN PATENTS

| Number | Country | Date |
|---|---|---|
| 647,468 | Germany | July 5, 1937 |

OTHER REFERENCES

Fiat Final Report No. 865, August 19, 1946, pages 40–57.

Electronic Industries, November 1945, pages 90–91.